United States Patent Office 3,570,240
Patented Mar. 16, 1971

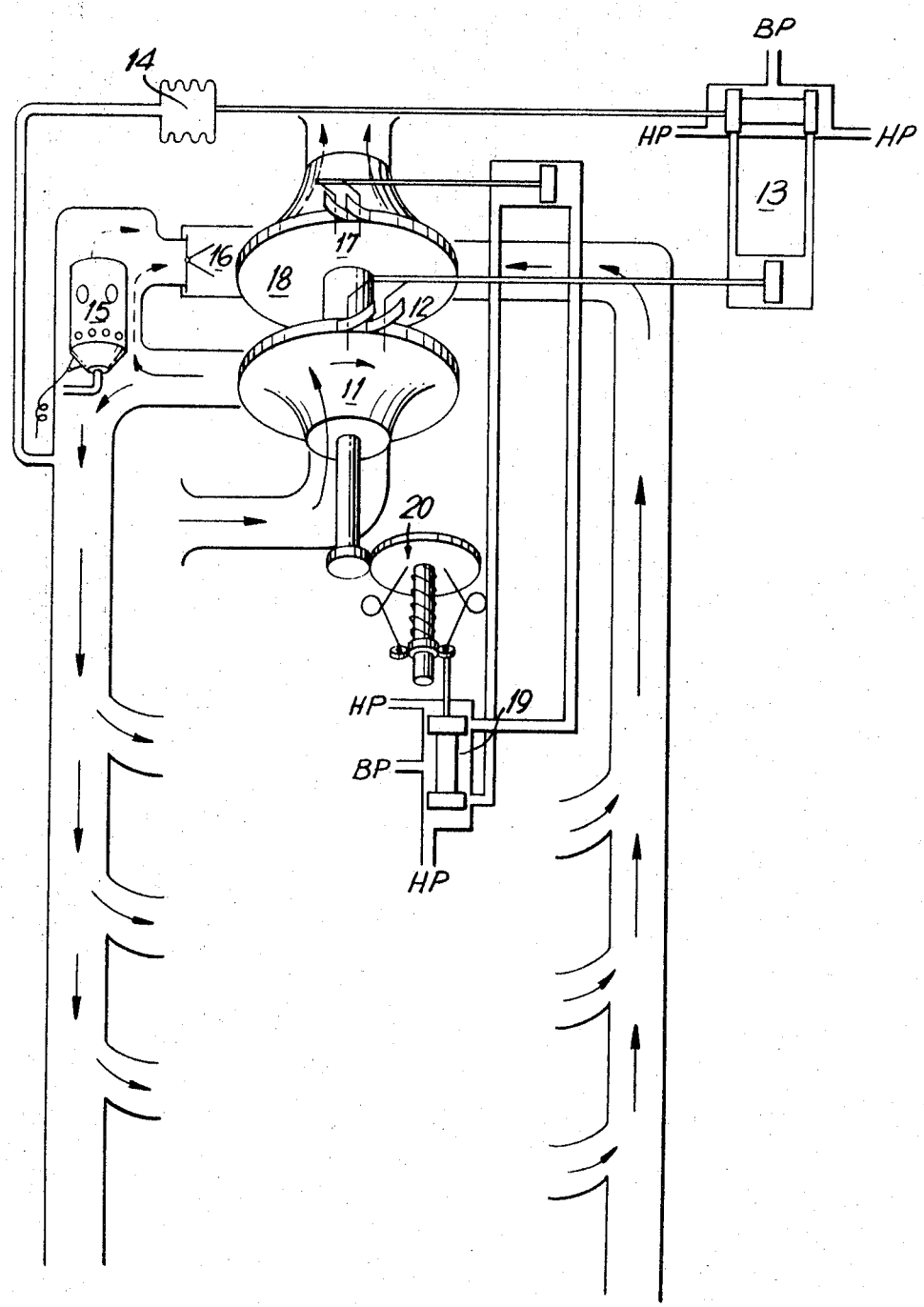

3,570,240
SUPERCHARGING APPARATUS FOR DIESEL AND MULTIFUEL ENGINES
Jean Melchior, Fontenay-aux-Roses, France, assignor to Etat Francais, represented by the Minister of Armed Forces (Ministerial Delegation of Weapons), Paris, France
Filed May 15, 1969, Ser. No. 824,810
Claims priority, application France, May 29, 1968, 153,339
Int. Cl. F02b 37/00
U.S. Cl. 60—13
11 Claims

ABSTRACT OF THE DISCLOSURE

Supercharging device for a Diesel engine comprising a combustion chamber and starting means for the turbo-compressor permitting the same to operate as a gas turbine. Said turbine, started prior to the engine, establishes in the intake manifold such conditions, relative to pressure and temperature, that initial ignition by combustion becomes possible with a low volume ratio. The turbine can also serve for starting the engine and for driving auxiliary services. After the starting of the Diesel engine, the combustion chamber of the device can be shut down. The energy necessary for the turbo-compressor, to enable it to furnish a sufficient supercharging pressure under all operating conditions, is then obtained by modifying the cross-section of the distributor of the turbine. One embodiment of the invention includes a regulating system which maintains the speed of rotation of the turbo-compressor and the supercharging pressure at a constant value.

DRAWING

FIG. 3 is a diagrammatic illustration of some of the details utilized in one of the embodiments of the invention.

DETAILED DESCRIPTION

The present invention relates to diesel engines of the type supercharged by at least one turbo-compressor unit driven by the exhaust gases of the associated engine.

It is known that supercharging permits increasing the power output of a volumetric engine of given cylinder volume. It is likewise known that in order to assure the starting of a Diesel engine, the combustion air must attain a certain temperature and pressure.

Since the turbo-compressors are at stand-still when the engine is being started, the conditions for ignition must be realized by volumetric compression alone. This explains the high compression ratio of Diesel engines, and even more so of multi-fuel Diesel engines. This high compression ratio for starting becomes an obstacle as soon as the engine rotates and drives its turbo-compressors.

Methods are known for reducing this ratio when the engine is operating under load. Such methods are all based on dynamic variation of the dead volume. These are the variable-compression-ratio systems. It is known that these methods permit an increase of the supercharging rate under load. It is also known, on the other hand, that a supercharged motor has a rising torque characteristic curve very unfavorable for a traction motor.

One object of the present invention is to realize a pronounced supercharging for a fixed compression ratio as low as the rate of supercharging is high.

Another object of the invention is to raise the torque characteristic curve for slow speeds.

The invention has the following accessory advantages to offer:

recovery of a greater portion of energy from the exhaust gases (energy derived in mechanical form, or in pneumatic form from the compressor output);
cold starts requiring several times less electric power than is conventional;
facility of independent operation of the turbo-compressor unit as an independent gas turbine.

Figure 1:
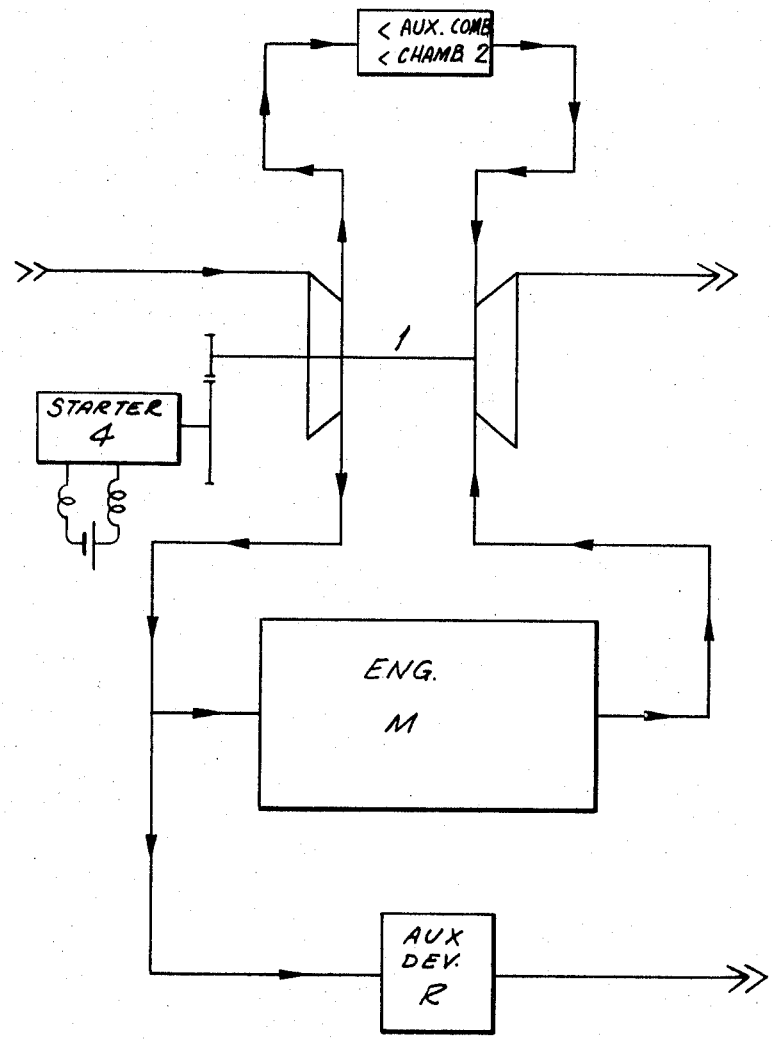
FIG. 1 is a schematic diagram of one embodiment of the invention.

For attaining these objectives, the invention is based upon a subdivision of the starting phase of the Diesel engine into three individual sequences:

(1) Starting the turbo-compressor 1 and placing it in autonomous operation by means of an auxiliary combustion chamber 2 mounted as a branch-off on the engine in accordance with FIG. 1. The unit then operates as a gas turbine and establishes, upstream from the intake valves of the engine, a pressure $P_2$ and a temperature $T_2$.

(2) Starting the engine which, since it receives air already compressed and heated, will start with a compression ratio which is lower based on higher values of $P_2$ and $T_2$.

(3) Extinction of the auxiliary combustion chamber, since its function of supplying the turbine is taken over by the exhaust gases from the engine.

In order that the supercharging pressure may be maintained sufficiently high after extinction of the combustion chamber, there is effected according to the invention a modification of the cross-section of the turbine distributor of the turbo-compressor unit. This causes the counter-pressure of the exhaust gases to vary so that they acquire the necessary energy for appropriately driving the turbo-compressor unit.

An installation according to the invention will, therefore, comprise the following elements, arranged as shown in FIG. 1:

(1) At least one turbo-compressor unit 1, of which at least the cross-section of the distributor portion is variable, and preferably also that of the diffuser of the compressor. This latter disposition actually permits adapting the output of the compressor to the operating condition of the engine, as well as to the needs of the different other receivers. The compressor unit is provided for delivering to the engine M, to at least one combustion chamber 2, and to other receivers R as required. The turbine of the unit 1 is provided for receiving two different inputs, namely the exhaust gases from the engine M, and the gases from the combustion chamber or chambers 2.

(2) At least one combustion chamber 2 located between the compressor and the turbine of group 1 in parallel to the engine.

(3) A starting system for the turbo-compressor unit 1. By way of illustration this system may, for example, consist of a D-C generator-starting motor combination 4.

Figure 2:
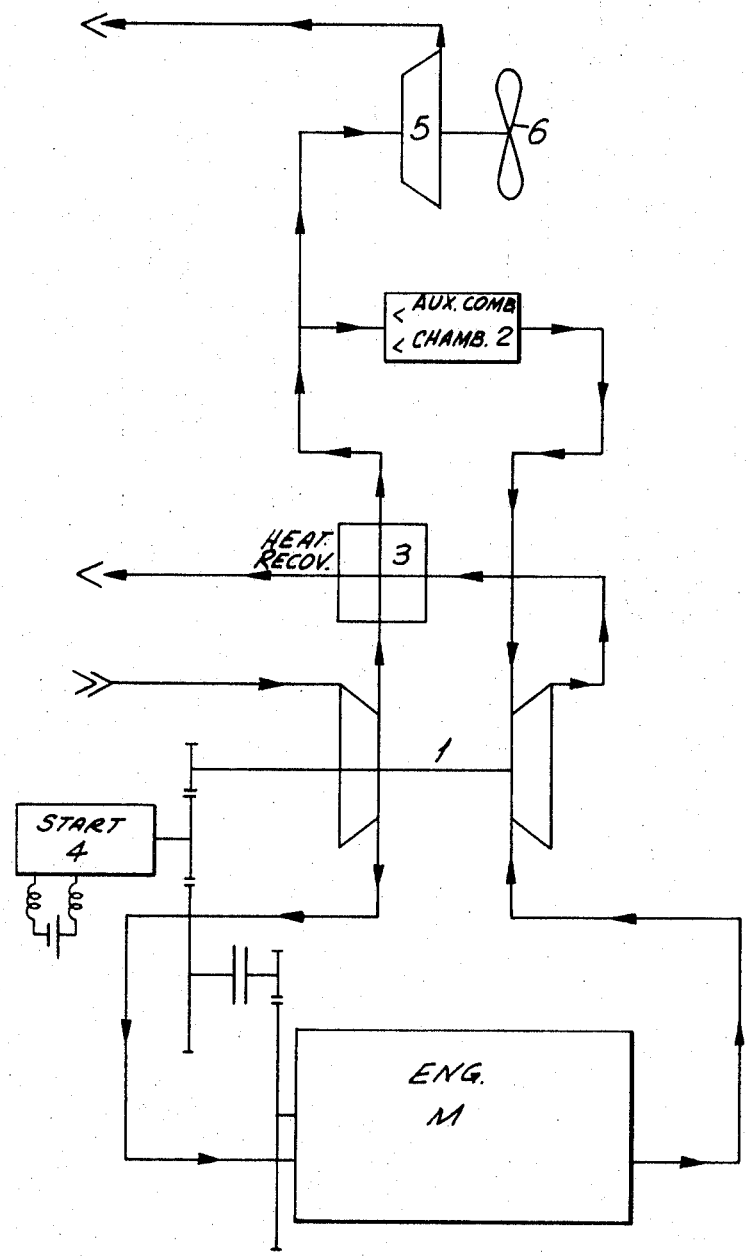
FIG. 2 is a schematic diagram of a second embodiment.

An embodiment of the invention of particular advantage for equipping an armored vehicle, on which an auxiliary electric power generating set is desirable, is schematically represented in FIG. 2. This comprises, in addition to the elements shown in FIG. 1:

A heat-recovery element 3 traversed, on the one hand, by a portion of the compressor air and, on the other, by the exhaust gases from the turbine; this recovery element increases the efficiency of the gas turbine when the combustion chamber is in operation, and raises the level of energy of the compressed air destined for driving the engine cooling fan under all other conditions;

A turbine 5 for driving an engine cooling fan 6; this fan, if driven mechanically, will absorb a non-negligible fraction of the engine power output; driven pneumatically, and particularly if the compressed air traverses a heat recovery chamber, the fan will derive a portion of its energy from the exhaust gases of the engine;

A mechanical coupling system 7 between the shaft of unit 1 and the starting ring gear of the engine; the power for starting the Diesel engine is in this case furnished by the turbo-compressor unit operating as a gas turbine; this coupling system may, for example, consist of an electromagnetic clutch;

A hydraulic cylinder modifying the turbine distributor as a function of the speed of rotation of the turbo-compressor unit, in such a manner that this speed will be maintained approximately constant in order to avoid delays due to the inertia of the turbo-compressor as loads are supplied to the engine;

A hydraulic cylinder modifying the diffuser of the compressor as a function of its delivery pressure in such a manner that said pressure is maintained approximately constant;

A valve arranged in the supply circuit of the fan-drive turbine and actuated as a function of the coolant temperature in such a manner that said temperature will be maintained approximately constant.

Thus, the present invention relates to the auxiliary drives of a supercharged Diesel engine and permits giving added importance to the turbo-engine portion of this hybrid engine. It relates to a novel combination of various elements known per se, which results in the following advantages:

Increase of the average effective pressure without increasing the maximum pressure;
Increase of torque developed at low r.p.m.;
Easy cold starting; and
Improved recovery of energy from the engine exhaust gases.

In terms of novel industrial products, the invention covers:

(1) The association of a variable-geometry turbo-compressor, of an auxiliary combustion chamber and of means for starting said compressor, in order to achieve, prior to engine starting, the pressure and temperature conditions permitting ignition by compression with a low compression ratio.

According to the invention, a regulating system controls the variable geometry of the turbo-compressor unit in such a manner that the air admitted to the engine will be sufficiently compressed for allowing ignition by compression after the combustion chamber has been extinguished.

Other arrangements are known in which a combustion chamber is provided for operation simultaneously with the reciprocating engine. According to the invention, this chamber is in operation only for starting the engine.

(2) The mechanical coupling arrangements between the shaft of the turbo-compressor unit and the engine crankshaft provided for realizing the starting of the engine.

FIG. 3 illustrates in greater detail one embodiment of the invention in which air enters the compressor 11 having a diffuser 12 with a section subjected to a supercharge pressured by a hydraulic device 13 and the bellows 14.

The air issues from the compressor in two directions: either into the combustion chamber 15, the fuel supply of which is controlled by a conventional constant speed regulator and the flow of which cannot be reversed by reason of the non-return valve 16; or into a diesel motor, the starting of which interrupts the supply of fuel to the chamber 15, for example, by means of an electrovalve.

The exhaust gases of the diesel motor go to the distributor 17 of the turbine 18 which is driven at a speed associated by the hydraulic system 19 and the centrifugal governor 20 with the speed of the supercharger. The speed of rotation and the supercharge pressure are thus constant.

What is claimed is:

1. Apparatus comprising turbo-compressor means, and engine, an auxiliary combustion chamber, said turbo-compressor means including a turbine section and a compressor section in interconnected relation, said compressor section having an output coupled to said chamber and engine, said engine and chamber having outputs coupled to said turbine section, said chamber enabling said turbo-compressor means to operate independently of said engine, starting means coupled to said turbo-compressor means to initiate operation of the same prior to the operation of the engine to provide for the latter pressure and temperature conditions such that the compressor ratio required by the engine for starting is reduced, heat recovery means coupled to the outputs of said turbine and compressor sections, and engine cooling fan means coupled to said heat recovery means and pneumatically driven thereby.

2. Apparatus as claimed in claim 1 comprising means to terminate the operation of said chamber when the engine has commenced operation, the turbine section being then driven by the output of said engine.

3. Apparatus as claimed in claim 1, wherein the starting means is an electrical starting motor.

4. Apparatus as claimed in claim 1 comprising auxiliary means coupled to and driven by said compressor section.

5. Apparatus as claimed in claim 1, wherein said turbo-compressor means includes a distributor portion of variable cross-section.

6. Apparatus as claimed in claim 1, wherein said compressor section includes a diffuser of variable cross-section.

7. Apparatus as claimed in claim 1, wherein said chamber is connected in parallel with said engine.

8. Apparatus as claimed in claim 1 comprising mechanical coupling means coupling said engine to said turbo-compressor means.

9. Apparatus as claimed in claim 8, wherein said coupling means is an electro-magnetic clutch.

10. Apparatus as claimed in claim 5 comprising a hydraulic cylinder means coupled to and adapted to vary the cross-section of said distributor portion.

11. Apparatus as claimed in claim 6 comprising a hydraulic cylinder means coupled to and adapted to vary the cross-section of said diffuser.

References Cited

UNITED STATES PATENTS

| | | | |
|---|---|---|---|
| 1,816,737 | 7/1931 | Moss | 123—119 |
| 1,816,787 | 7/1931 | Moss | 123—119 |
| 2,159,758 | 5/1939 | Diedrich | 60—11 |
| 2,305,810 | 12/1942 | Muller | 123—119 |
| 2,412,365 | 12/1946 | Sollinger | 60—13 |
| 2,423,417 | 7/1947 | Stokes | 123—119 |
| 2,585,029 | 2/1952 | Nettel | 60—13 |
| 2,620,621 | 12/1952 | Nettel | 60—13 |
| 3,048,005 | 8/1962 | Egli | 60—13 |
| 3,068,638 | 12/1962 | Birmann | 60—13 |

FOREIGN PATENTS

| | | | |
|---|---|---|---|
| 866,461 | 4/1961 | Great Britain | 60—13 |

DOUGLAS HART, Primary Examiner

U.S. Cl. X.R.

123—41.65, 119